Nov. 1, 1932.  E. E. WICKERSHAM  1,885,971
PICK-UP
Filed April 17, 1929
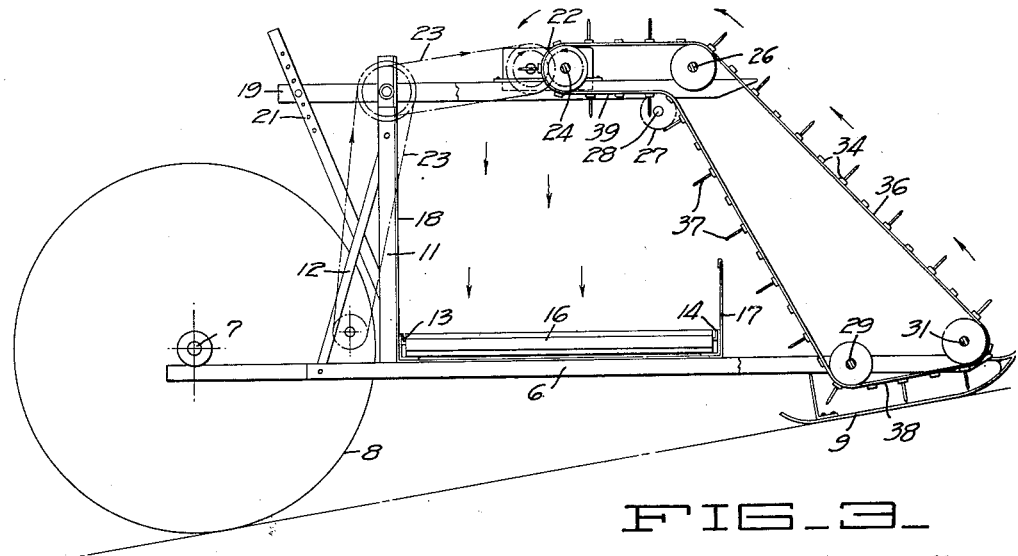
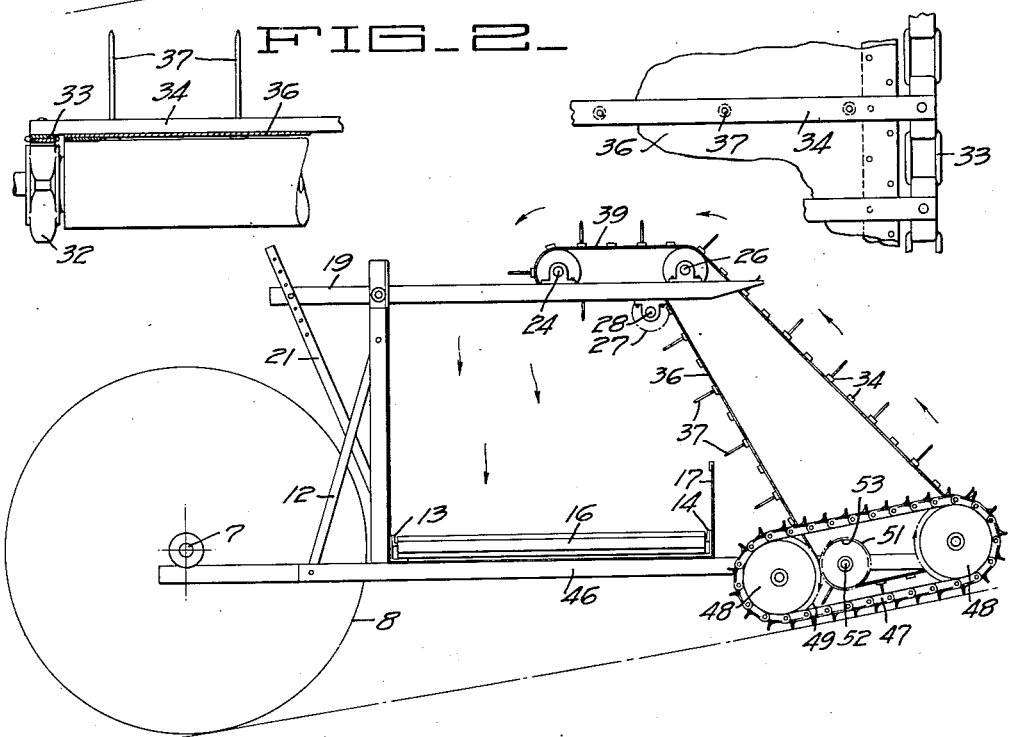
INVENTOR
Elmer E. Wickersham
BY
White, Prat & Fryer
ATTORNEYS Patented Nov. 1, 1932

1,885,971

UNITED STATES PATENT OFFICE

ELMER E. WICKERSHAM, OF SAN LEANDRO, CALIFORNIA, ASSIGNOR TO CATERPILLAR TRACTOR CO., OF SAN LEANDRO, CALIFORNIA, A CORPORATION OF CALIFORNIA

PICK-UP

Application filed April 17, 1929. Serial No. 355,684.

My invention relates to harvesting machinery and particularly to devices which are especially adapted for retrieving cut grain situate in a field. In accordance with one method of harvesting, the standing grain is cut by a suitable machine propelled over the field and is left lying on the ground in windrows or is bound into stacked bundles. As an additional variation the cut grain can be left lying broadcast in the field; that is, without being gathered in windrows. Following this operation and usually after the grain has been left in the field to dry for a considerable period of time, a subsequent machine is driven over the ground to pick up the grain and transfer it to a separating mechanism where it is threshed.

In the present instance, it is an object of my invention to provide a machine which is capable of being driven over a field to pick up grain which may be lying therein either broadcast, in windrows or in bundles.

Another object of my invention is to simplify to a material degree the mechanism necessary for picking up grain lying broadcast or in windrows on the ground.

Another object of my invention is to preclude back-feeding in a pick-up device employing a conveyor.

The foregoing and other objects are attained in the embodiment of the invention shown in the drawing, in which, Fig. 1 is a transverse cross section on a vertical plane of one form of pick-up of my invention.

Fig. 2 is a detail of a roller and sprocket with the belt and tangs thereon shown in cross section.

Fig. 3 is a fragmentary view showing in plan a portion of the belt and sprocket chain of my pick-up.

Fig. 4 shows in end elevation a modified form of pick-up of my invention.

In its preferred embodiment, the pick-up of my invention comprises a framework having a ground engaging support, on which is mounted a draper and a plurality of parallel rollers carrying a belt one portion of which extends substantially parallel to the ground and another portion of which extends over the approximate center of the draper. The belt ordinarily is provided with tangs to assist in engaging the grain.

In the form of my invention shown in Figures 1, 2 and 3, I preferably provide a framework 6 fabricated of suitable metal shapes such as angles and channels. This framework is customarily supported on an axle 7 carrying a ground engaging wheel 8. The forward end of framework 6 rests on a skid 9 adapted to run over the surface of the ground. Adjacent the rear portion of the framework and forming a part thereof are several uprights 11 connected by braces 12 with the bottom members of the frame 6. Proximate the junction of uprights 11 and the bottom members is a pair of nested angles 13 disposed to face a second pair of nested angles 14 and between them carry a draper 16 of the customary kind. A front board 17 extends upwardly along the leading border of the draper to assist in confining grain thereto while a similar backboard 18 is secured to the uprights 11. Adjacent their upper ends, a pair of the uprights carries cantilever arms 19 suitably pivoted and held in any of several adjusted positions by perforated stays 21. By suitably connecting the stay with the arm 19 any desired angularity of arms 19 may be obtained.

Almost directly over the center of draper 16 one of the arms carries a reverse gear 22 which is driven by chains 23 from the source of power available on the carriage to which my pick-up is customarily attached. Leading from the gear box is a shaft 24 extending along the pick-up framework and journalled at each of its ends on the cantilever arms 19. This shaft preferably is substantially parallel to the surface of the ground over which the machine operates and is likewise parallel to a second shaft 26 likewise journalled at the forward end of the arms 19. In addition to the two shafts mentioned the cantilever arms carry idlers 27 rotatably mounted on stub-shafts 28 to act as guides. On the forwardly projecting part of the framework 6 are disposed shafts 29 and 31 preferably located at equal distances from the ground and arranged in parallelism with the remainder of the shafts.

Each of the shafts mentioned carries at each end a sprocket 32 adapted to mesh sprocket chains 33 which encompass the entire group of shafts at each end thereof. Slats 34 are connected to the chains 33 at suitable intervals and support a belt 36 of a flexible material, preferably treated canvas. Piercing alternate slats are a number of tangs 37 which project a material distance from the slats and preferably are sufficiently long approximately to touch the surface of the ground when they are in the lower run of the belt. The disposition of the various shafts is such that the chains 33 and belt 36 take the form shown in Fig. 1 in which there is a primary relatively flat portion 38 extending approximately parallel to the ground and a secondary relatively flat portion 39 likewise substantially parallel to the ground and overlying the central part of draper 16. Drive shaft 24 is driven in the direction of the arrow in Fig. 1 so that the upper side of the conveyer from the sprockets on shaft 31 to the sprockets on shaft 24 is the tight side and is used for picking the material up from the ground and for elevating the material to a position above the draper. The bottom side of the conveyer from the sprockets on shaft 24 to the sprockets on shaft 31 is the slack side and includes portion 39 above and substantially parallel to the draper for effectively discharging the material upon the draper and portion 38 adjacent and substantially parallel to the ground for gathering the material on the ground.

In the operation of this form of my pick-up the entire framework is propelled over the ground at a predetermined or selected rate of speed. By means of chains 23 and reverse gearing 22 the belt and sprocket chains are driven so that the portion 38 advances at approximately double the rate of advance of the vehicle as a whole. The tangs as they travel adjacent the ground therefore rake up and gather in the grain which is lying thereon and carry the grain upwardly over the upper part of the belt and discharge it approximately on the central region of the draper. Bundles of grain are usually engaged by the foremost tangs as they round the leading shaft 31.

The relatively long and substantially horizontal portion 39 extending far over the draper is effective in permitting portions of the grain which ordinarily would adhere to the belt and to the tangs to drop off and be received by the draper so that the belt 36 is substantially non-clogging and self-clearing, while back feeding is precluded.

As shown in Figure 4, I sometimes modify my pick-up by altering the driving arrangement for the belt. In this instance, the framework 46 is provided at its forward end with a ground engaging element of the track layer type. This comprises an endless track 47 mounted on suitable sprockets 48 the rearmost of which carries a gear 49 in mesh with a high speed gear 51 of approximately half the diameter. The gear 51 is on the same shaft 52 that carries a lower and rearward roller 53 corresponding in other respects to roller 29. With this embodiment, when the vehicle is propelled over the ground at the predetermined rate the track-layer attachment imparts sufficient speed to the roller 51 to drive the portion of the belt adjacent the ground at approximately double the rate of advance of the machine as a whole so that the picking up operation is effected in substantially the same manner as in the first instance.

In either event, it is possible by virtue of my invention to provide a relatively simple and cheap device which can be propelled over a field having cut grain thereon to gather the cut grain in an effective and efficient manner and to discharge the grain onto a draper for further handling. Difficulty is avoided by omission of complicated mechanisms for varying the tang angle and for supporting the flexible belt. These are not necessary inasmuch as the tangs are relatively rigidly affixed to the slats.

It is to be understood that I do not limit myself to the form of the pick-up shown and described herein, as the invention, as set forth in the following claims may be embodied in a plurality of forms.

I claim:

1. A pick-up comprising a framework having relatively adjustable portions, a plurality of parallel rollers mounted on said several portions, a belt encompassing said rollers, tangs on said belt, and means for retaining said portions in a selected adjusted position.

2. A pick-up comprising a framework, a draper on said framework, a ground-engaging support on said framework, a shaft on said framework adjacent said support, a shaft on said framework adjacent said draper, sprockets spaced on each of said shafts, chains engaging said sprockets, rollers on each of said shafts between said sprockets, a belt contacting said rollers, slats secured to said belt and to said chains, and tangs mounted on said slats.

3. In a harvester, a pick-up, comprising an endless conveyor having a material gathering stretch substantially parallel to the ground and studded with tangs maintained normal to the surface of said conveyor.

4. In a harvester, a pick-up, comprising an endless conveyor having a gathering stretch, a pick-up turn, a conveying stretch forming part of the over-reach of the conveyor, a discharge turn, a discharge stretch, and a return stretch; and means for driving the conveyor so that movement of the gathering stretch is in the direction of advancement of the harvester and toward the front of the pick-up.

5. A pick-up comprising an endless conveyer, means for driving said conveyor in a direction to provide a tight side to elevate material, and a slack side, a portion of said slack side being spaced from and substantially parallel to the ground to gather material on the ground.

6. In a harvester, the combination with a draper, of a pick-up comprising an endless conveyor, means for driving said conveyor in a direction to provide a tight side and a slack side, a portion of said slack side being spaced from and substantially parallel with the ground to gather material on the ground, a portion of said tight side being rounded adjacent the ground to pick material up from the ground, a portion of said tight side being inclined to elevate material, and a portion of said slack side being above and substantially parallel to said draper to discharge material on said draper.

7. In a harvester, a main frame, a draper thereon, an auxiliary frame adjustably secured to said main frame, a flexible, endless conveyer, guides on said main frame to maintain a portion of said conveyer substantially parallel to the ground, and guides on said auxiliary frame to maintain a portion of said conveyer substantially parallel to said draper.

8. In a harvester, a pick-up comprising, an endless conveyer, a main frame, an auxiliary frame, guides for said conveyer on said frames, and a connection between said frames to adjust the distance between said guides.

9. A pick-up comprising, parallel shafts, a pair of sprockets and a roller on each shaft, a pair of chains engaging said sprockets, slats connected to said chains, and a belt secured to said slats and contacting said rollers.

10. In a harvester, a pick-up comprising an endless conveyor, guide means for said conveyor to provide a material gathering stretch spaced from and substantially parallel to the ground, and means for driving said conveyor so that movement of the gathering stretch is in the direction of advancement of the harvester and toward the front of the pick-up.

11. In a harvester, a pick-up comprising an endless conveyor, guide means for said conveyor to provide a material gathering stretch spaced from and substantially parallel to the ground, tangs on said conveyor, and means for driving said conveyor to effect raking of the ground by the tangs on the gathering stretch in the direction of advancement of said harvester and toward the front of the pick-up.

12. In a harvester, a pick-up comprising an endless conveyor, guide means for said conveyor to provide a material gathering stretch spaced from and substantially parallel to the ground, tangs on said conveyor, said tangs being of a length substantially equal to the distance between the gathering stretch and the ground, and means for driving said conveyor to effect raking of the ground by the tangs on the gathering stretch and in a direction to provide slack in the gathering stretch.

13. In a harvester, a pick-up comprising an endless conveyor, guide means for said conveyor to provide a material gathering stretch spaced from and substantially parallel to the ground, tangs on said conveyor adapted to rake the ground while on the gathering stretch, and means for driving the conveyor in a direction to provide slack in the gathering stretch.

14. In a harvester, the combination with a draper, guide means for said conveyor to provide a material gathering stretch spaced from and substantially parallel to the ground, additional guide means to provide a material discharge stretch above and substantially parallel to said draper, and means for driving said conveyor so that movement of the gathering stretch is in the direction of advancement of the harvester and toward the front of the pick-up.

15. In a harvester, the combination with a draper, guide means for said conveyor to provide a material gathering stretch spaced from and substantially parallel to the ground, additional guide means to provide a material discharge stretch extending over said draper, tangs on said conveyor adapted to rake the ground while on the gathering stretch, and means for driving the conveyor in a direction to provide slack in the gathering and discharge stretches.

16. In a harvester, the combination with a draper, guide means for said conveyor to provide a material gathering stretch spaced from and substantially parallel to the ground, additional guide means to provide a material discharge stretch extending over said draper, tangs on said conveyor adapted to rake the ground while on the gathering stretch, said tangs being of a length substantially equal to the distance between the gathering stretch and the ground, and means for driving said conveyor so that movement of the gathering stretch is in the direction of advancement of the harvester and toward the front of the pick-up.

17. In a harvester, a main frame, an auxiliary frame adjustably secured thereto, an endless pick-up conveyor, means for supporting one terminal portion of the conveyor solely on the main frame, and means for supporting the other terminal portion of the conveyor solely on the auxiliary frame, whereby the degree of slack in said conveyor can be adjusted by relative adjustment of said frames.

18. In a harvester, a draper, a main frame, an auxiliary frame adjustably secured to the main frame, an endless pick-up conveyor supported by said frames, guide means on the auxiliary frame for providing a material discharge stretch extending over said draper, and guide means on the main frame to provide a material gathering stretch substantially parallel to the ground.

19. In a harvester, a draper, a main frame, an auxiliary frame adjustably secured to the main frame, an endless pick-up conveyor supported by said frames, guide means on the auxiliary frame for providing a material discharge stretch extending over said draper, guide means on the main frame to provide a material gathering stretch substantially parallel to the ground, and means for driving said conveyor so that movement of the gathering stretch is in the direction of advancement of the harvester and toward the front of the pick-up.

In testimony whereof, I have hereunto set my hand.

ELMER E. WICKERSHAM.